US011675152B2

(12) United States Patent
Maker et al.

(10) Patent No.: US 11,675,152 B2
(45) Date of Patent: Jun. 13, 2023

(54) METHOD AND APPARATUS FOR MOUNTING OPTICAL COMPONENTS

(71) Applicant: M SQUARED LASERS LIMITED, Glasgow (GB)

(72) Inventors: Gareth Thomas Maker, Glasgow (GB); Graeme Peter Alexander Malcolm, Glasgow (GB); Simon Munro, Glasgow (GB)

(73) Assignee: M SQUARED LASERS LIMITED, Glasgow (GB)

( * ) Notice: Subject to any disclaimer, the term of this patent is extended or adjusted under 35 U.S.C. 154(b) by 781 days.

(21) Appl. No.: 14/889,005

(22) PCT Filed: May 9, 2014

(86) PCT No.: PCT/GB2014/051413
§ 371 (c)(1),
(2) Date: Nov. 4, 2015

(87) PCT Pub. No.: WO2014/181116
PCT Pub. Date: Nov. 13, 2014

(65) Prior Publication Data
US 2016/0070083 A1    Mar. 10, 2016

(30) Foreign Application Priority Data

May 10, 2013   (GB) ..................... 1308433

(51) Int. Cl.
*B23K 1/00*        (2006.01)
*G02B 7/00*        (2021.01)
(Continued)

(52) U.S. Cl.
CPC ............ *G02B 7/003* (2013.01); *B23K 1/0008* (2013.01); *G02B 6/4238* (2013.01); *G02B 7/00* (2013.01);
(Continued)

(58) Field of Classification Search
CPC .. G02B 6/4236; G02B 6/4226; G02B 6/4238; B23K 1/0008; B23K 2201/36; B23K 35/0222
See application file for complete search history.

(56) References Cited

U.S. PATENT DOCUMENTS 5,829,125 A    11/1998  Fujimoto
5,896,481 A *   4/1999  Beranek ............... G02B 6/4224
                                              385/90
(Continued)

FOREIGN PATENT DOCUMENTS

EP    1 150 152 A1    10/2001
EP    1 176 440 A1     1/2002
(Continued)

*Primary Examiner* — Erin B Saad
(74) *Attorney, Agent, or Firm* — FisherBroyles, LLP

(57) ABSTRACT

A method and apparatus for mounting optical components is described. The apparatus (1) is suitable for mounting multiple optical components (2) and comprises a baseplate (3) having opposing first (4) and second (5) surfaces. Recesses or apertures (7) are formed within the baseplate and are located upon the first or second surfaces so as to define thermally activated optic mounting areas. Pillars (13) are then located within the thermally activated optic mounting areas and these provide a means for attaching the optical component to the baseplate (3). The employment of the recesses or apertures act to significantly reduce the thermal conduction throughout the baseplate. As a result preferential heating can be provided to the one or more thermally activated optic mounting areas while maintaining the baseplate with a desired mechanical strength. The optical mounting apparatus exhibits a high thermal stability thus making the apparatus ideally suited for use within commercial optical system.

17 Claims, 7 Drawing Sheets

(51) Int. Cl.
*G02B 6/42* (2006.01)
*G02B 7/02* (2021.01)
*G02B 7/182* (2021.01)

(52) U.S. Cl.
CPC ............ *G02B 7/023* (2013.01); *G02B 7/025* (2013.01); *G02B 7/1822* (2013.01)

(56) References Cited

U.S. PATENT DOCUMENTS

| | | | |
|---|---|---|---|
| 6,907,059 B1 * | 6/2005 | Miura | H01S 3/025 |
| | | | 156/101 |
| 2002/0114579 A1 | 8/2002 | Case et al. | |
| 2005/0018742 A1 * | 1/2005 | Hall | G01M 11/04 |
| | | | 372/99 |
| 2005/0047747 A1 | 3/2005 | Sano | |
| 2005/0129371 A1 | 6/2005 | Massey | |
| 2005/0276542 A1 | 12/2005 | Steegmuller et al. | |
| 2011/0317735 A1 | 12/2011 | Miyokawa | |
| 2013/0095611 A1 * | 4/2013 | Huang | H01L 23/49827 |
| | | | 438/110 |

FOREIGN PATENT DOCUMENTS

| | | |
|---|---|---|
| EP | 1 345 059 A1 | 9/2003 |
| JP | S58137293 A | 8/1983 |
| JP | H09-051016 A | 2/1997 |
| JP | 2005-070553 A | 3/2005 |
| JP | 2005338862 A | 12/2005 |
| JP | 2006319265 A | 11/2006 |
| WO | WO2010/110068 | 9/2012 |

* cited by examiner

METHOD AND APPARATUS FOR MOUNTING OPTICAL COMPONENTS

This application is the U.S. national phase of International Application No. PCT/GB2014/051413 filed 9 May 2014 which designated the U.S. and claims priority to GB Patent Application No. 1308433.0 filed 10 May 2013, the entire contents of each of which are hereby incorporated by reference.

The present invention relates to the field of optics. More specifically, the present invention concerns a method and apparatus for mounting optical components, for example the optical components employed within a laser cavity.

Traditionally, optics have been mounted in laser cavities through the employment of "ball and spring" type mounts. As is known to those skilled in the art, ball and spring type mounts require periodic realignment due to the ageing of the springs and their susceptibility to the effects of temperature drifting. Furthermore, the optic housed in these mounts is typically retained via a grub screw which acts as a source of pressure directly onto the optical component itself. Both of these factors make ball and spring mounts undesirable for use within a commercial laser device.

An alternative technique for mounting optics known to those in the art is to employ a bonding medium on a substrate with a dedicated heating element. The heating element is employed to heat the bonding medium, either directly or via the substrate, as and when it is required to mount, or remove, the optical component. European patent publication number EP 0 196 875 describes such a system that employs a chip resistor to locally heat a solder so as to provide a means for mounting an optical component upon a substrate. Alternatively, U.S. Pat. No. 5,930,600 describes the use of PTC-thermistors or NTC thermistors as the heating element. Such elements are described as being desirable over the known resistor based heaters as they provide increased control over the heating process such that the bonding medium does not need to be heated to temperatures well above their associated melting point, thus reducing the likelihood of damage to the optical component to be mounted on, or removed from, the substrate. PTC-thermistors or NTC thermistors are however more expensive than the more traditional resistor based heaters thus making them less desirable for use within commercial systems.

A further problem of employing the above described techniques lies in the fact that solders are known to cause movement during cooling between planar surfaces being secured to one another. This problem is further exacerbated when PTC-thermistors or NTC thermistors are employed since these components themselves are also known to exhibit inherent movement during periods of heating and cooling. Such movement is obviously problematic for the alignment of an optical component since it can significantly reduce the available tolerance.

It is also found that when the above described heating elements are employed to heat the bonding medium via a planar substrate that it can be difficult to transfer sufficient heat to the bonding medium. This is due to the generated heat being conducted throughout the entire substrate and not just towards the area where the optical component is to be mounted. One solution to this problem is to increase the level of heat generated by the heating element however this can lead to increased issues of movement during the heating and cooling cycles. In some circumstances, the adhesive that is employed to attach the heating element to the substrate can itself start to melt thus causing these components to separate.

A proposed solution to this problem is described in U.S. Pat. No. 5,930,600. This involves mounting all of the components in a stack on the same side of the substrate e.g. a stack comprising a layer of solder/optical component/layer of adhesive/thermistor. A significant drawback to such an arrangement is the fact that the solder is heated by the thermistor via the optical component itself. As will be appreciated by the skilled reader, it is undesirable for a commercial laser device to repeatedly expose its optical components to direct heating as this can result in damage to the component. In addition, such embodiments are found to exhibit significant thermal stability problems for the associated optical component due to the fact that there are different interfaces, which employ different bonding mediums, which each exhibit different thermal coefficients of expansion. This problem is further exacerbated by the fact that the optical components are often employed in stacks having two or more layers of solder, layers of adhesive, thermistors, support plates etc. all of which may exhibit different thermal coefficients of expansion.

It is therefore an object of an aspect of the present invention to obviate or at least mitigate the foregoing disadvantages of the method and apparatus for mounting optical components known in the art.

SUMMARY OF INVENTION

According to a first aspect of the present invention there is provided an optic mounting apparatus for mounting one or more optical components the apparatus comprising a baseplate having opposing first and second surfaces wherein the baseplate comprises one or more recesses or apertures arranged upon the first or second surfaces, the location of the one or more recesses or apertures defining one or more thermally activated optic mounting areas.

The employment of the one or more recesses or apertures act to reduce the thermal conduction throughout the whole of the baseplate. As a result preferential heating can be provided to the one or more thermally activated optic mounting areas while maintaining a desired mechanical strength within the baseplate.

Optionally the one or more thermally activated optic mounting areas are defined by two or more recesses or apertures located around its perimeter.

The one or more thermally activated optic mounting areas may be defined by one or more recesses located upon the second surface.

Most preferably the baseplate further comprises one or more ledges extending from the first surface and located around the perimeter of a thermally activated optic mounting area. Incorporation of the one or more ledges helps to retain a solder during the mounting or removal of an optical component.

Optionally the baseplate further comprises one or more countersunk apertures. These countersunk apertures provide a means for screws to secure the optic mounting apparatus within an optical system.

The optic mounting apparatus preferably further comprises one or more heating elements located in thermal contact with the one or more thermally activated optic mounting areas. Most preferably the one or more heating elements are located within the one or more recesses located upon the second surface.

Most preferably the optic mounting apparatus further comprises one or more pillars the one or pillars having a first end mechanically connected to the one or more thermally activated optic mounting areas. The one or more pillars may be mechanically connected to the one or more thermally activated optic mounting areas by a solder.

Preferably the one or more pillars comprise a second end suitable for mechanical connection to an optical component. An adhesive may provide the mechanically connection between the second end of the one or more pillars and an optical component.

The first end of the one or more pillars preferably comprises a rounded profile. Most preferably the first end of the one or more pillars comprises a hemispherical profile. The employment of a rounded or hemispherical profile for the first end of the pillars is found to reduce the stress placed upon the mounted optics.

The optic mounting apparatus may further comprise one or more angled mounts suitable for mechanical attachment to one or more optical components. The angle of this component is chosen so as to reduce any relative movement with the associated optical component.

Preferably the one or more angled mounts comprise a threaded aperture.

The optic mounting apparatus may further comprise an adjustable arm at a distal end of which is located an angled mount attachment. The angled mount attachment provides a means for the adjustable arm to be mechanically connected to one or more angled mounts.

The adjustable arm may further comprise an attachment arm located at its proximal end. The attachment arm provides a means for the adjustable arm to be mechanically connected to a reference point e.g. the wall of the housing for an optical system.

Preferably the attachment arm comprises a dowel that provides a means for orientating the adjustable arm relative to the reference point.

According to a second aspect of the present invention there is provided a method of mounting an optical component the method comprising:
  providing a baseplate having opposing first and second surfaces with one or more thermally activated optic mounting areas;
  locating one or more heating elements in thermal contact with the one or more thermally activated optic mounting areas;
  locating a pillar and optical component assembly within the one or more thermally activated optic mounting areas; and
  employing the one or more heating elements to solder the pillar and optical component assembly to the thermally activated optic mounting area.

Providing the baseplate with one or more thermally activated optic mounting areas may comprise providing one or more recesses or apertures so as to define the location of the one or more thermally activated optic mounting areas.

Optionally the one or more thermally activated optic mounting areas are defined by locating two or more recesses or apertures around its perimeter.

The one or more thermally activated optic mounting areas may be defined by locating one or more recesses upon the second surface.

The method of mounting an optical component may further comprise providing one or more ledges extending from the first surface and located around the perimeter of a thermally activated optic mounting area.

The method of mounting an optical component may further comprise providing the baseplate with one or more countersunk apertures.

Most preferably the one or more heating elements are located in thermal contact with the one or more thermally activated optic mounting areas by locating the one or more heating elements in one or more recesses located upon the second surface.

Preferably a register and dowel system is employed to locate the pillar and optical component assembly within the one or more thermally activated optic mounting areas.

Employing the register and dowel system preferably comprises mechanically attaching an angled mount to the optical component.

Employing the register and dowel system may further comprise mechanically attaching a distal end of an adjustable arm to the angled mount.

Employing the register and dowel system may further comprise mechanically attaching a proximal end of the adjustable arm to a reference point. The reference point may comprise one or more apertures located within an optical system.

Optionally a tinning layer is applied to a first end of the pillar prior to soldering the pillar and optical component assembly to the optic mounting area.

Embodiments of the second aspect of the invention may comprise features to implement the preferred or optional features of the first aspect of the invention or vice versa.

BRIEF DESCRIPTION OF DRAWINGS

Aspects and advantages of the present invention will become apparent upon reading the following detailed description and upon reference to the following drawings in which.

DETAILED DESCRIPTION

Methods and apparatus for mounting optical components will now be described with reference to FIGS. 1 to 6.

Figure 1:
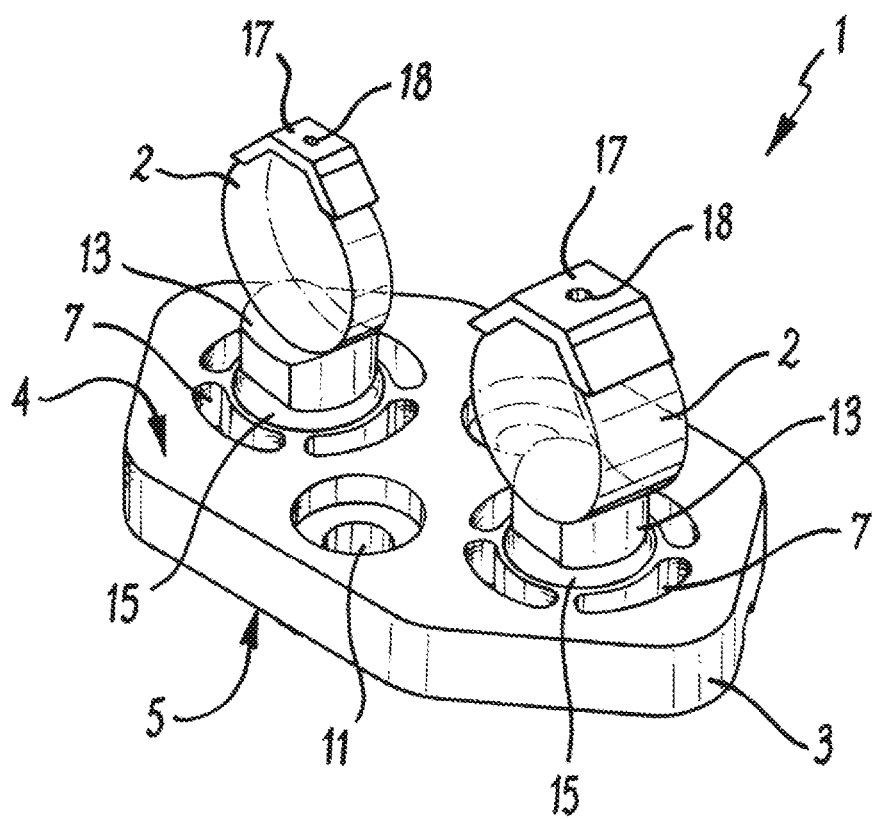
FIG. 1 presents a schematic representation of an optic mounting apparatus in accordance with an embodiment of the present invention.
Figure 2:
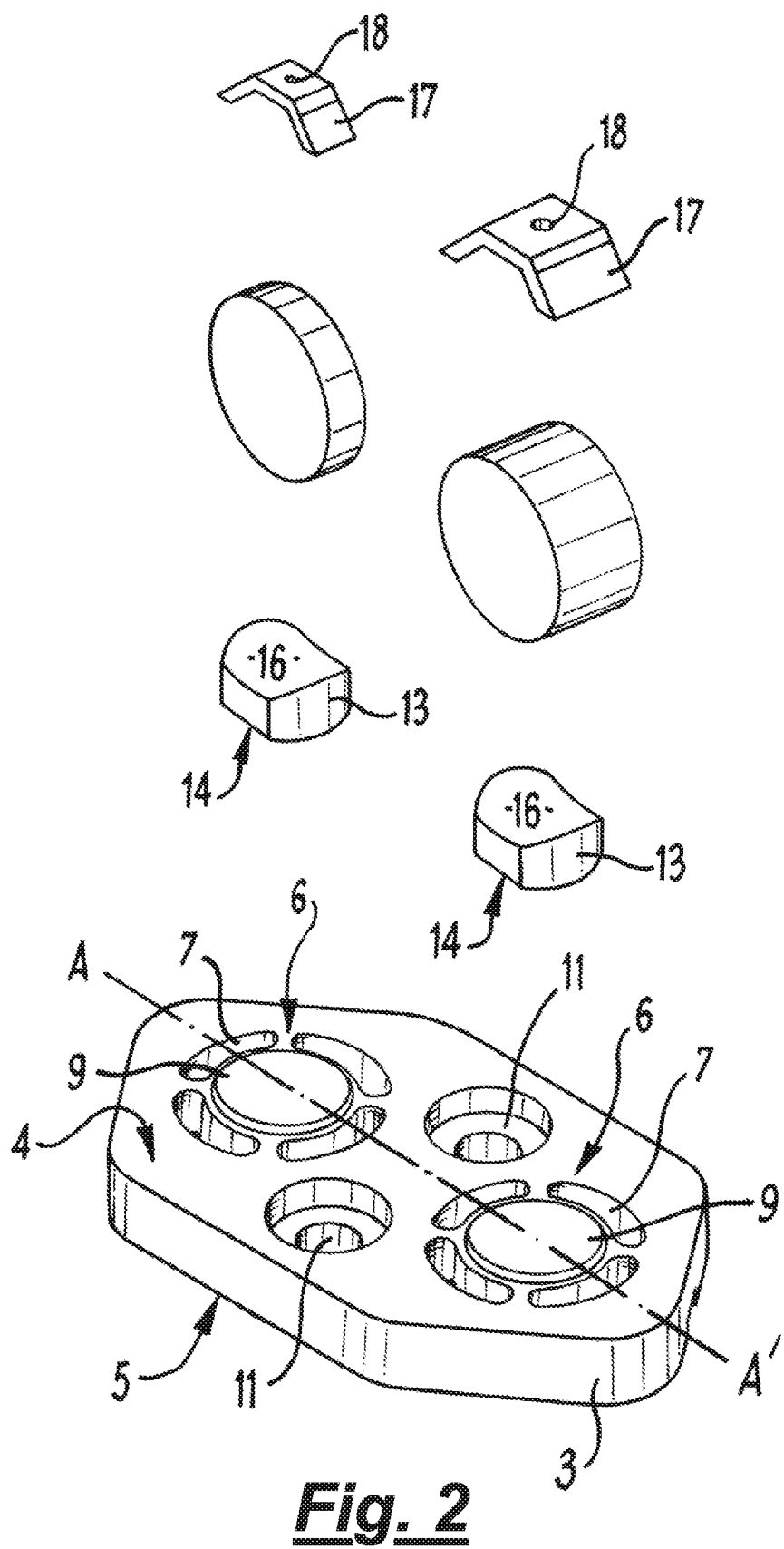
FIG. 2 presents an exploded representation the optic mounting apparatus of FIG. 1.
Figure 3:
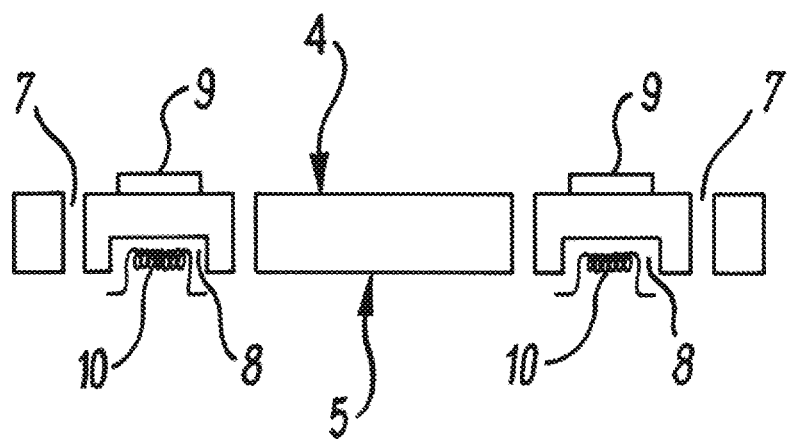
FIG. 3 presents a cross sectional view along axis AA' of the optic mounting apparatus of FIG. 1.

In the first instances FIGS. 1 to 3 presents various representations of an optic mounting apparatus, as depicted generally by reference numeral 1. In the presently described embodiment the mounting apparatus 1 is designed for mounting two optical components 2 e.g. a lens or a mirror. It will however be appreciated by the skilled reader that in alternative embodiments the apparatus may be adapted for the mounting a single optical component 2, or for more than two optical components 2.

The optics mounting apparatus 1 comprises a baseplate 3 having opposing first 4 and second surfaces 5. On the first surface 4 are located two thermally activated optic mounting areas 6. The term "thermally activated" highlights the requirement within the mounting apparatus 1 for heat to be supplied in order to mount and or remove an optical component.

The thermally activated optic mounting areas 6 may be defined by the presence of one or more apertures 7 located around its perimeter and or by a recess 8 located on the second surface 5, further details of which are described below. It is preferable for a ledge 9, that extends from the first surface 4, to also be located around the perimeter of the thermally activated optic mounting areas 6. When used in conjunction with the one or more apertures 7, the apertures 7 are positioned so as to lie outside of the area defined by the ledge 9.

In the presently described embodiment each thermally activated optic mounting area 6 comprises a circular ledge 9 and four apertures 7 wherein each aperture 7 forms an arc section that, like the circular ledge 9, is centred on the associated thermally activated optic mounting area 6. All of the apertures 7 pass all the way through the baseplate 3, although in alternative embodiments this need not necessarily be the case. From FIG. 3 it can be seen each thermally activated optic mounting area 6 also comprise a recess 8 located on the second surface 5. Each recess 8 has a circular cross section that is greater in area than that of the corresponding circular ledge 9. In addition the recesses 8 are concentric with their associated circular ledge 9. The recesses 8 house a heating element 10 that is employed within the process for mounting the associated optical component 2, as described in further detail below. A standard resistor may be employed as the heating element 10 within the optic mounting apparatus 1.

Two countersunk apertures 11 are also present on the first surface 4 of the baseplate 3. The countersunk apertures 11 provide a means for screws 12 to secure the optic mounting apparatus 1 within an optical system.

It will be appreciated that in alternative embodiments of the baseplate the relative sizes and positions of the optic mounting areas 6 and their corresponding recesses 8 may vary. In addition, one or both of the raised ledges 9 may be replaced by a recessed area formed on the first surface 4.

The optic mounting apparatus 1 further comprises a pillar 13. As best be seen from FIG. 2, a first end 14 of the pillar 13 that locates with the optic mounting areas 6 exhibits a rounded profile, and preferably a hemispherical profile.

A layer of solder 15 is employed to secure the pillar 13 to the optic mounting area 6. In a similar manner a first layer of adhesive is employed to secure the optical component 2 to a second end 16 of the pillar 13. A second layer of adhesive may be employed to secure an angled mount 17 to the optical component 2. It is preferable for the mounting process, described in further detail below, for the angled mount 17 to be provided with a threaded aperture 18 and to be secured to the optical component 2 such that it lies substantially opposite to the interface between the pillar 13 and the optical component 2. The angle of this component is chosen so as to reduce any relative movement with the optical component 2 to which it is attached. The angled mount 17 may for example exhibit a 90° angle.

In order to enhance the thermal stability of the optic mounting apparatus 1, and thus assist in the high precision location of the optical component 2, it is desirable for the baseplate 3 and the pillar 13 to be made from a material that exhibits a low coefficient of thermal expansion. The preferred material for these components is Invar®. Invar®, also known generically as $FeNi_{36}$, is a nickel iron alloy notable in the art for its uniquely low coefficient of thermal expansion.

Method of Mounting an Optical Component

Figure 4:
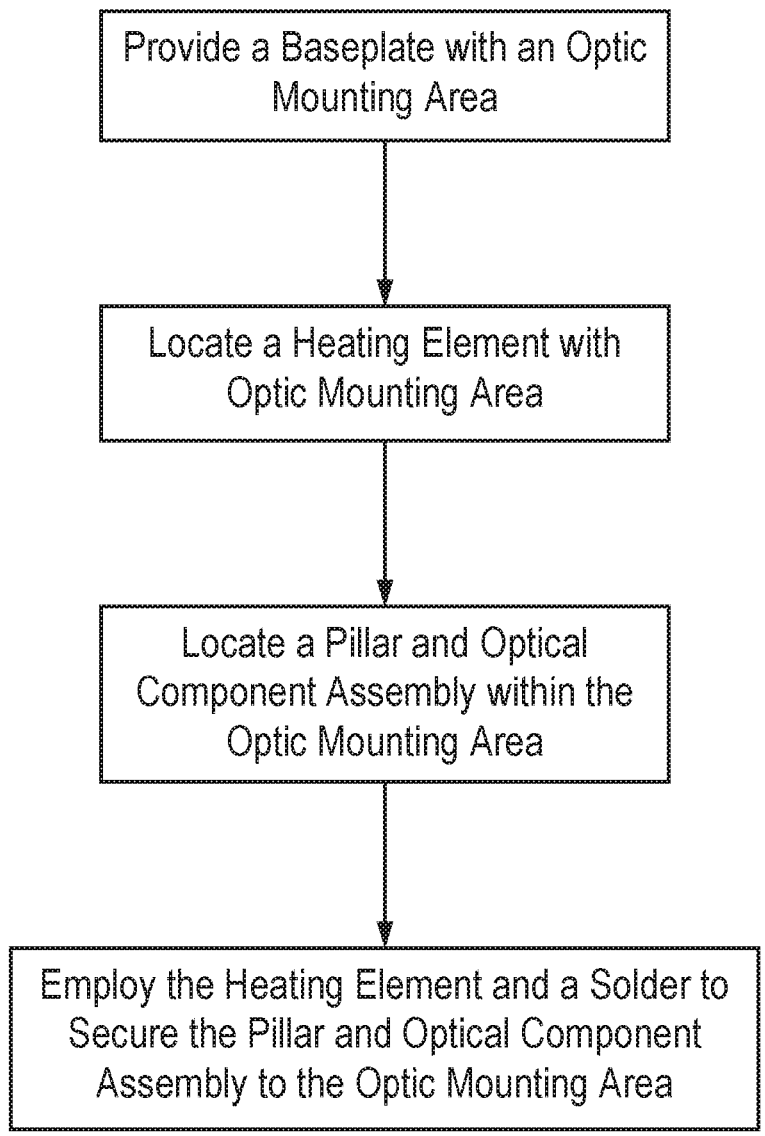
FIG. 4 presents a flow chart of the method of mounting the optical component.

A method for mounting the optical component 2 on the optic mounting apparatus 1 will now be described with reference to the flow chart of FIG. 4.

The first step involves the provision of one or more of the above described thermally activated optical mounting areas 6 on the baseplate 3.

The heating element 10 is then located in thermal contact with the thermally activated optic mounting area 6. This is preferably achieved by locating the heating element 10 within the recess 8 of the second surface 5.

The pillar 13 and optical component 2 assembly is then located within thermally activated optic mounting area 6 and the heating element 10 is then employed to heat solder within the optic mounting area 6. This may be achieved by introducing new solder to the optic mounting area 6 at the time of applying heat, by reheating the layer of solder 15 already present within the optic mounting area 6 or via a combination of both of these procedures.

When the optical component 2 is correctly aligned the heat being applied to the optic mounting area 6 is removed so that the layer of solder 15 cures, thus securing the optical component in the desired location.

When the baseplate 3 and pillar 13 are formed from Invar® it is found to be advantageous for the above described soldering process to initially tin the first end 14 of the pillar 13. Tinning assists in reducing the effects of oxidation on the first surface 14 of the pillar 13 and so allows for a more reliable and secure attachment to be made between the baseplate 3 and pillar 13.

It will be appreciated by the skilled reader that the order of a number of the above processes may be changed. By way of example the pillar 13 and optical component 2 assembly could be located within the thermally activated optic mounting area 6 prior to the heating element 10 being located with the optic mounting area 6.

The above process may further comprise the step of securing the optical component 2 to the second end 16 of the pillar 13 by introducing the first layer of adhesive. Preferably this process would be carried out prior to the pillar 13 and optical component 2 assembly being located within the thermally activated optical mounting area 6. Alternatively, this process could be carried out after the pillar 13 has been soldered to the baseplate 3 however such an order is less desirable since it increases the difficulty in correctly aligning the optical component 2.

Register and Dowel System

The process of locating an optical component 2 within a thermally activated optical mounting area 6 will now be described further with reference to an optical system 19, represented schematically in FIG. 5. The process employs an adjustable arm 20, various views of which can be seen in FIG. 6, that mechanically connects to an angled mount 17 so as to effectively form a register and dowel system.

The adjustable arm 20 can be seen to comprise an attachment arm 21 and an elongated section 22 mechanically connected to each other in a substantially parallel orientation by a support bar 23 that is itself substantially perpendicular to both of the attachment arm 21 and the elongated section 22. The orientation of the support bar 23 defines a reference axis 24 for the adjustable arm 20.

Three apertures 25 are located through the attachment arm 21 which provide a means for three screws 26 to secure the position of the adjustable arm 20 within the optical system 19, further details of which are provided below. A dowel 27 is also mechanically attached to, and extends from, the attachment arm 21 along an axis substantially parallel to the reference axis 24. As explained below, the dowel 27 defines a reference point for the adjustable arm 20.

A slot 28 is formed in the distal end of the elongated section 22. The slot 28 provides a means for setting, and securing the longitudinal position of a ball and spring mount 29 on the elongated section 22. In the presently described embodiment a screw 30 provides the attachment means such that the ball and spring mount 29 extends from the elongated section 22 towards the attachment arm 21.

The ball and spring mount 29 is employed to locate an angled mount attachment 31 that is shaped so as to mate with the surface of the angled mount 17 not secured to the optical component 2. An aperture 32 provides for a means the angled mount attachment 31 to be secured to the angled mount 17 by employing a grub screw threaded through the aperture 32 so as to locate with the threaded aperture 18 of the angled mount 17.

It can be seen that the angled mount attachment 31 is located at the distal end of a sliding arm 33, the sliding arm being mechanically connected to the ball and spring mount 29 by a support 34 that is housed therein. Movement of the sliding arm 33 relative to the support 34 acts to change the spatial position of the angled mount attachment 31 along an axis substantially parallel to the reference axis 24.

Figure 5:
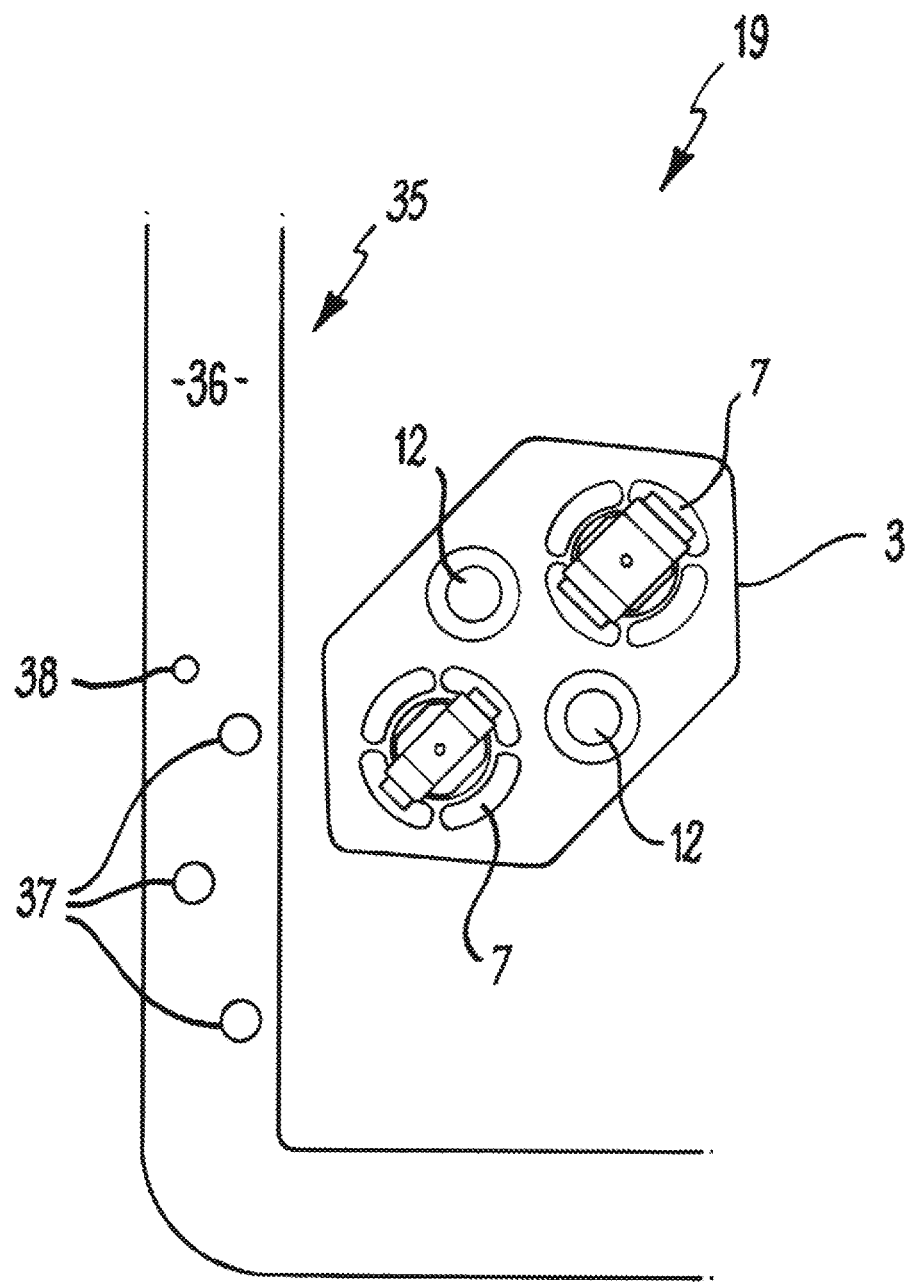
FIG. 5 presents a top view of a section of a laser cavity within which is located the optic mounting apparatus of FIG. 1.
Figure 6A:
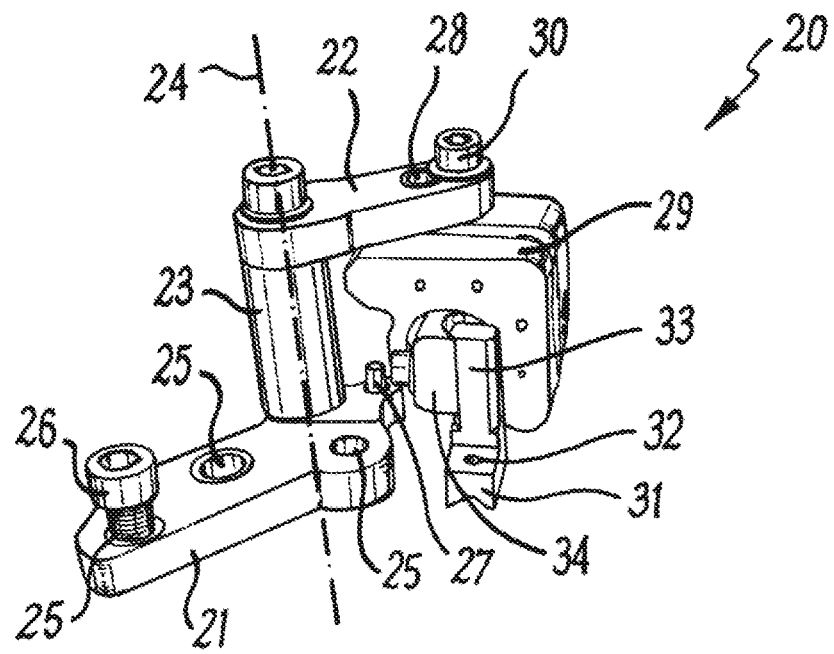
FIG. 6 presents: (a) a front view
(b) a side view; and
(c) a back view
of an adjustable arm employed to mount a mirror within the laser cavity of FIG. 5.
Figure 6B:
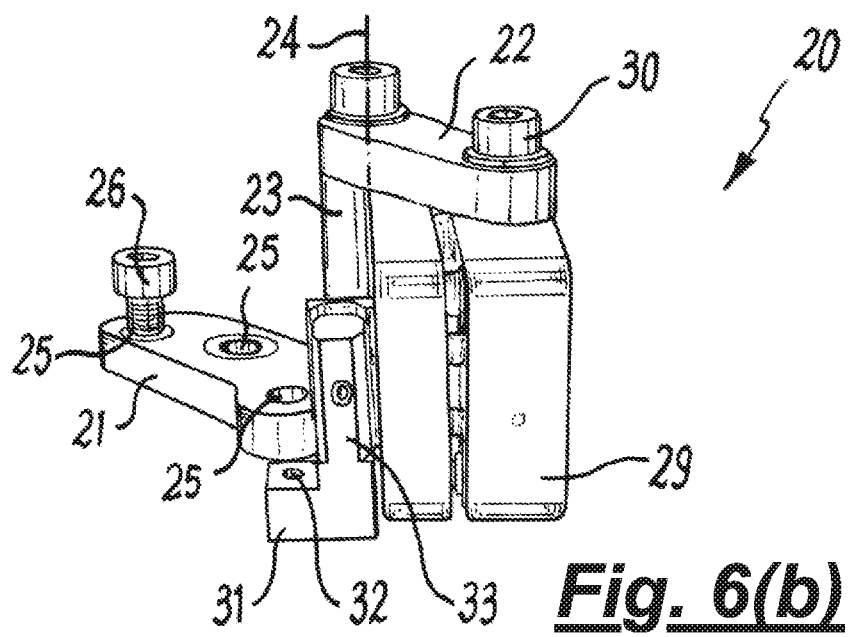
Figure 6C:
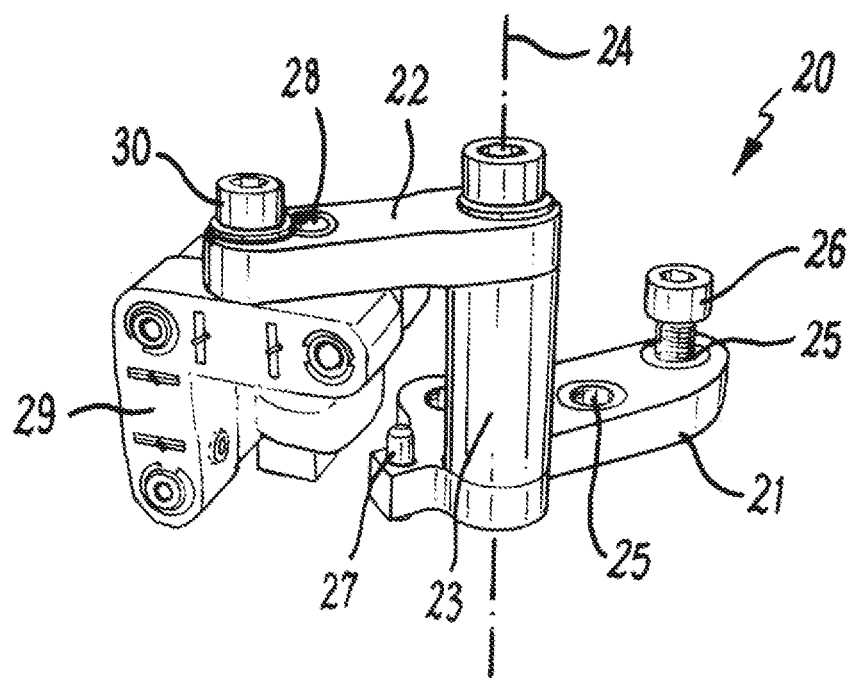

From FIG. 5, the optical system 19 can be seen to comprise a housing 35 having an external wall 36 and within which is located a baseplate 3.

Three threaded holes 37 having a first diameter and a fourth non-threaded reference hole 38 having a second diameter are located within the external wall 36. The threaded holes 37 are designed to receive one or more screws 26 once these have been passed through the attachment arm 21. The non-threaded reference hole 38 is designed to provide an interference fit with the dowel 27 of the attachment arm 21.

When a pillar 13 and optical component 2 assembly is to be deployed within the system 19 it is simply attached via its angled mount 17 to the angled mount attachment 31 of the adjustable arm 20. Once attached, the dowel 27 is then located within the appropriate non-threaded reference hole 38 and one or more screws 26 are then employed the secure the adjustable arm 20 to the external wall 36 of the housing 35.

In the presently described embodiment the diameter of the non-threaded reference hole 38 is smaller than the diameter of the threaded holes 37 so as to avoid a screw 26 being inadvertently inserted into the non-threaded reference hole 38.

At this time the pillar 13 is located within an appropriate thermally activated optic mounting area 6 and the layer of solder 15 can then be applied as previously described. When the layer of solder 15 has cured the angled mount attachment 31 can then be released from the angled mount 17 and adjustable arm 20 released the external wall 36 of the housing 35. The optical component 2 is then fixed in place with the correct optical alignment for the optical system 19.

The above process can simply be reversed when it is necessary to remove the optical component 2 from the optical system 19.

The design of the baseplate 3 provides the optic mounting apparatus 1 with a number of advantages over those systems known in the art. In the first instance the employment of the apertures 7 and or the recess 8 act to reduce thermal conduction throughout the whole of the baseplate 3 and thus provide preferential heating to the optic mounting area 6 while still maintaining the desired mechanical strength. This means that lower levels of heating are required in order to melt the layer of solder 15 thus reducing the effects of thermal movement or the potential for damage to the optical component 2 itself.

The rounded or hemispherical design of the first end 14 of the pillar 13 also provides the optic mounting apparatus 1 with a further significant advantage over the prior art systems. It is found that this shaped profile acts to significantly reduce the stress experienced by the optical component 2 once mounted on the baseplate 3.

The optical mounting apparatus 1, and hence any optical system 19 which employs these components, exhibit a significantly higher thermal stability than systems which employ optical mounting apparatus known in the art. For example laser systems employing the optical mounting apparatus 1 have been shown to exhibit significantly reduced effects of thermal drift.

In addition to the above, it is found that the above apparatus and methods simplify the set up of an optical system 19 and the replacement process of any optical components 2 contained therein. Indeed, the optical components 2 can be repeatedly removed from and inserted into the optical system 19 without any further adjustment being required to the alignment of the optical system 19. These are obviously highly advantageous features for a commercial optical system, for example the optical components employed within a laser cavity.

A method and apparatus for mounting optical components is described. The apparatus is suitable for mounting multiple optical components and comprises a baseplate having opposing first and second surfaces. Recesses or apertures are formed within the baseplate and are located upon the first or second surfaces so as to define thermally activated optic mounting areas. Pillars are then located within the thermally activated optic mounting areas and these provide a means for attaching the optical component to the baseplate. The employment of the recesses or apertures act to significantly reduce the thermal conduction throughout the baseplate. As a result preferential heating can be provided to the one or more thermally activated optic mounting areas while maintaining the baseplate with a desired mechanical strength. The optical mounting apparatus exhibits a high thermal stability thus making the apparatus ideally suited for use within commercial optical system.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. An optic mounting apparatus for mounting one or more optical components within an optical system, the apparatus comprising a baseplate having a first surface to which the one or more optical components are mounted and an opposing second surface, wherein the baseplate comprises one or more thermally activated optic mounting areas on the first surface, wherein each of the one or more thermally activated optic mounting areas are defined by one or more recesses or apertures arranged upon the first surface, the one or more recesses or apertures being located to substantially surround a perimeter of an associated thermally activated optic mounting area.

2. An optic mounting apparatus as claimed in claim 1 wherein the one or more thermally activated optic mounting areas are further defined by one or more recesses located upon the second surface directly under each of the one or more thermally activated optic mounting areas.

3. An optic mounting apparatus as claimed in claim 1 wherein the baseplate further comprises one or more ledges extending from the first surface and located around the perimeter of a thermally activated optic mounting area.

4. An optic mounting apparatus as claimed claim 1 wherein the baseplate further comprises one or more countersunk apertures.

5. An optic mounting apparatus as claimed in claim 1 wherein the optic mounting apparatus further comprises one or more heating elements located in thermal contact with the one or more thermally activated optic mounting areas.

6. An optic mounting apparatus as claimed in claim 1 wherein the one or more thermally activated optic mounting areas are further defined by one or more recesses located upon the second surface directly under each of the one or more thermally activated optic mounting areas, and wherein the optic mounting apparatus further comprises one or more heating elements located within the one or more recesses located upon the second surface such that the one or more heating elements are in thermal contact with the one or more thermally activated optic mounting areas.

7. An optic mounting apparatus as claimed in claim 1 wherein the optic mounting apparatus further comprises one or more pillars, the one or more pillars having a first end mechanically connected to the one or more thermally activated optic mounting areas.

8. An optic mounting apparatus as claimed in claim 7 wherein the one or more pillars are mechanically connected to the one or more thermally activated optic mounting areas by a solder.

9. An optic mounting apparatus as claimed in claim 7 wherein the one or more pillars comprise a second end suitable for mechanical connection to an optical component.

10. An optic mounting apparatus as claimed in claim 9 wherein an adhesive provides the mechanical connection between the second end of the one or more pillars and the optical component.

11. An optic mounting apparatus as claimed in claim 7 wherein the first end of the one or more pillars comprises a rounded profile.

12. An optic mounting apparatus as claimed claim 7 wherein the first end of the one or more pillars comprises a hemispherical profile.

13. An optic mounting apparatus as claimed in claim 1 wherein the optic mounting apparatus further comprises one or more angled mounts suitable for mechanical attachment to one or more optical components.

14. An optic mounting apparatus as claimed in claim 13 wherein the one or more angled mounts comprise a threaded aperture.

15. An optic mounting apparatus as claimed in claim 1 wherein the optic mounting apparatus further comprises an adjustable arm at a distal end of which is located an angled mount attachment.

16. An optic mounting apparatus as claimed in claim 15 wherein the adjustable arm further comprises an attachment arm located at its proximal end, the attachment arm providing a means for the adjustable arm to be mechanically connected to a reference point.

17. An optic mounting apparatus as claimed in claim 16 wherein the attachment arm comprises a dowel, the dowel providing a means for orientating the adjustable arm relative to the reference point.

* * * * *